April 16, 1968 E. R. SANDHAGE ET AL 3,377,989
AUTOMATIC EGG INOCULATING UNIT

Filed Aug. 8, 1966 5 Sheets-Sheet 2

INVENTORS.
ELSWORTH ROLAND SANDHAGE
ALLAN HARRY HAMMAR
BY
Norton S. Johnson
ATTORNEY

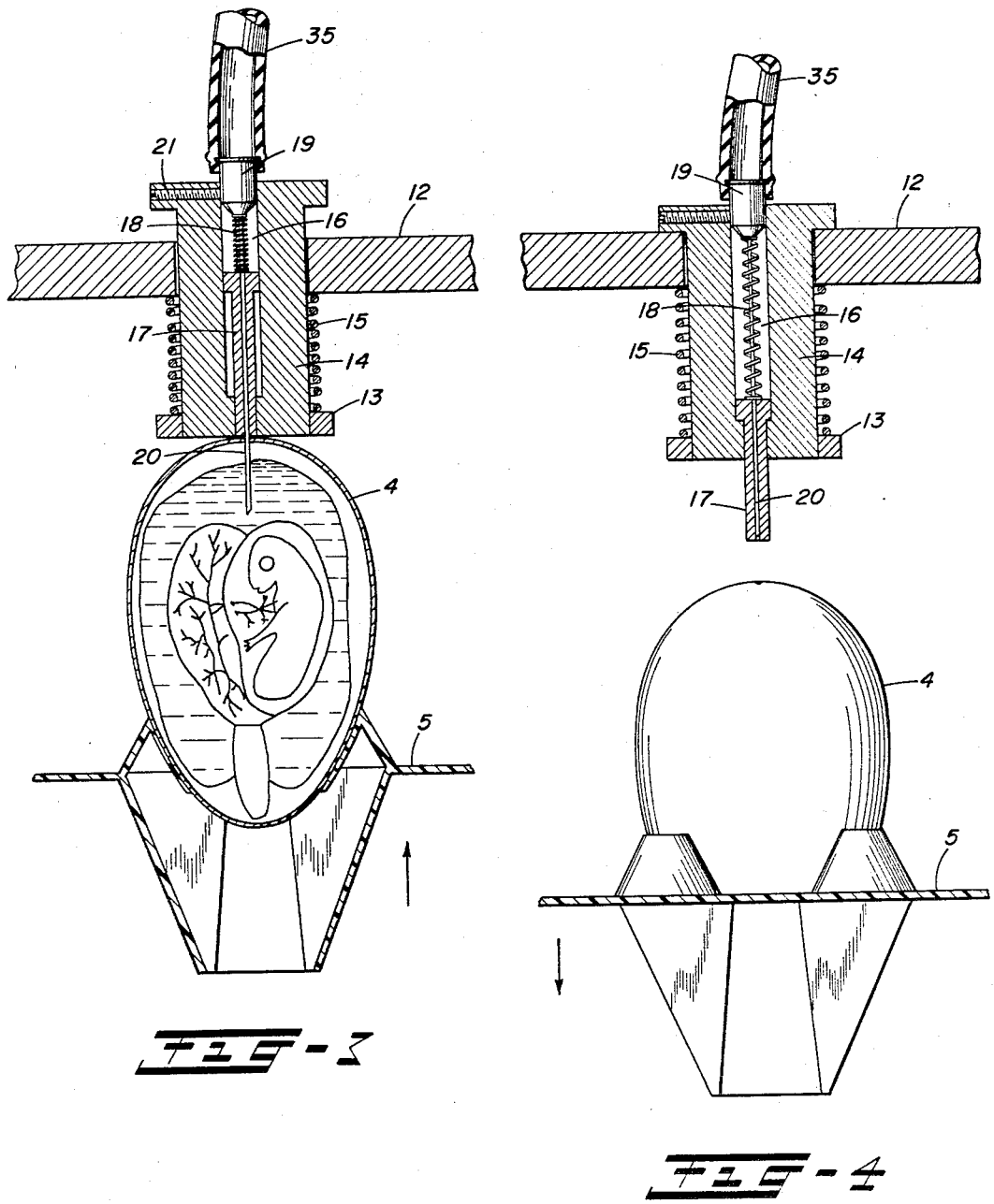

April 16, 1968 E. R. SANDHAGE ET AL 3,377,989
AUTOMATIC EGG INOCULATING UNIT
Filed Aug. 8, 1966 5 Sheets-Sheet 4

INVENTORS.
ELSWORTH ROLAND SANDHAGE
ALLAN HARRY HAMMAR
BY
Norton S. Johnson
ATTORNEY April 16, 1968    E. R. SANDHAGE ET AL    3,377,989
AUTOMATIC EGG INOCULATING UNIT
Filed Aug. 8, 1966    5 Sheets-Sheet 5
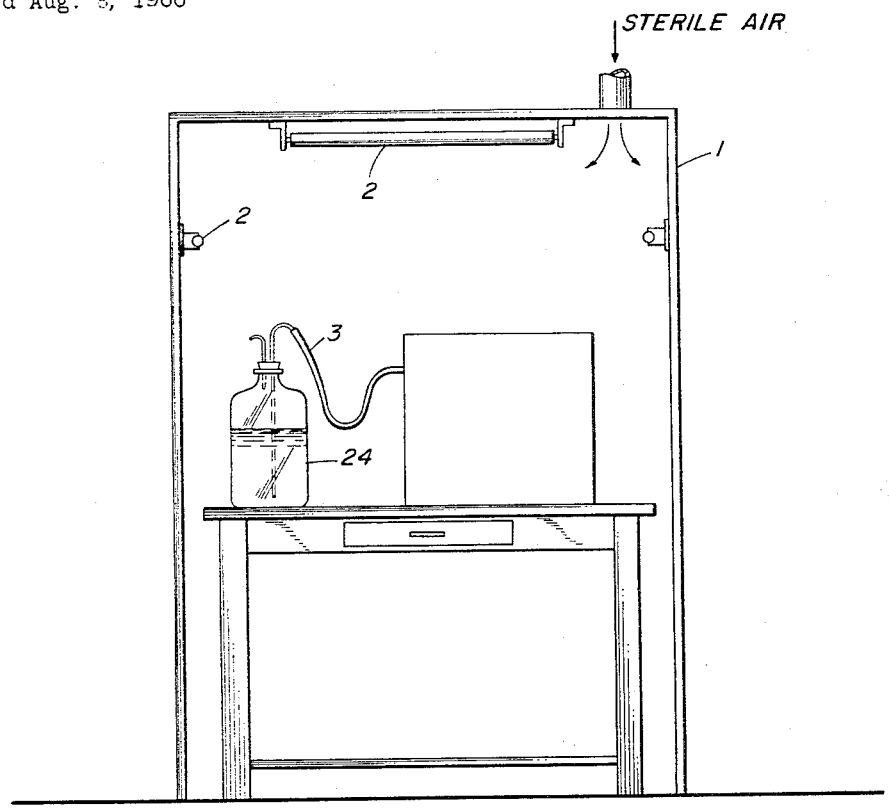
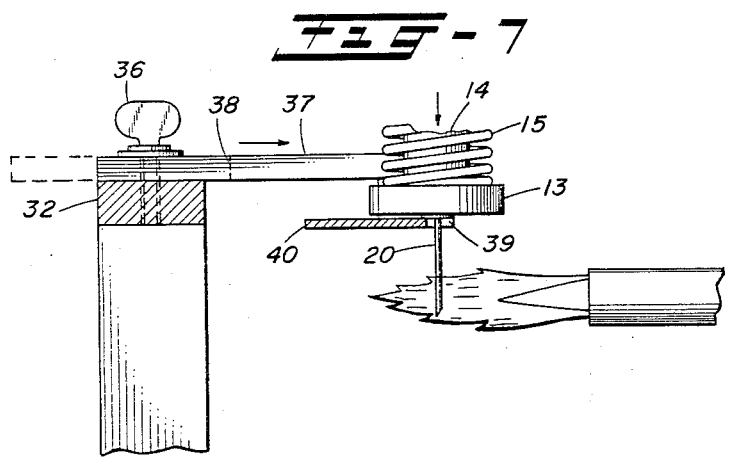
INVENTORS.
ELSWORTH ROLAND SANDHAGE
ALLAN HARRY HAMMAR
BY
Norton S. Johnson
ATTORNEY United States Patent Office 3,377,989
Patented Apr. 16, 1968

3,377,989
AUTOMATIC EGG INOCULATING UNIT
Elsworth Roland Sandhage, Pearl River, and Allan Harry Hammar, Monsey, N.Y., assignors to American Cyanamid Company, Stamford, Conn., a corporation of Maine
Filed Aug. 8, 1966, Ser. No. 571,034
10 Claims. (Cl. 119—1)

This invention relates to an automated machine for inoculating eggs with biological material, particularly fertile eggs under sterile conditions.

Fertile or embryonated eggs are used in enormous numbers for the incubating and harvesting of biologicals such as vaccines. In general, a pathogen, such as a virus, rickettsia, bacteria or mycotic agents, are injected into the allantoic sac, amniotic sac, or yolk sac of an embryonated egg. The microorganism is incubated for a predetermined number of days and then the resulting increased number of microorganisms are harvested. The process is useful for producing attenuated viruses and the like by successive passages where the embryonated egg is an unnatural host and is used even more extensively in cultivating and harvesting already attenuated virus vaccines and the like. The number of eggs used for the latter purpose runs into the many thousands of dozens of eggs a week.

In the past the embryonated eggs were inoculated by hand, the operator using a fine drill to make a hole in the egg. Then, in a separate operation, a predetermined amount of inoculum is injected. Several requirements have to be met. First, the operation must be conducted under sterile conditions, that is apart from the inoculum itself, in order to prevent contamination with other microorganisms. It is more or less standard procedure to provide a sterile environment, such as a suitable enclosure with sterilizing radiation, for example ultraviolet sterilamps, air, and the like. An important requirement is that the operation shall not result in high rate of traumatic injury to the embryo, which would otherwise die, and of course such an egg produces no harvest of biologicals, and unless carefully screened out can contaminate harvest. It goes without saying that there is a definite limit to the speed with which even a skilled operator can work, and 20 eggs per minute represents about the maximum attainable. The operator first disinfects the egg shell and makes a hole through the shell of the egg with a drill and then another operator again disinfects the shell and introduces the inoculum into the egg with a needle syringe assembly. There is a limit on how small the drill can be, the smallest drills being substantially greater in diameter than the inoculating needle of the syringe. It is often necessary to seal the relatively large holes made by the drill, for example with collodion, in order to keep down contamination, which could otherwise be introduced through the relatively large hole.

Marked savings in time and the possibility of automation would exist if the egg could be inoculated automatically, with the syringe needle performing both the function of penetrating the egg shell and introducing the inoculum. However, this has proved to be completely impractical. If a fine hypodermic needle is used, it is too flexible and bends. On the other hand, if a larger gauge needle is used, which would be sufficiently strong to puncture the eggshell without being bent, the eggshell may be fragmented, which can introduce contamination from fragments of the shell and can also result in traumatic injury to large numbers of embryos. As a result, it has been standard practice up to the time of the present invention to effect inoculation manually using a drill which does not fragment the eggshell, but as has been pointed out above, this requires a drill of fairly heavy gauge so that it will not be bent or broken and creates the problem of closure of holes, which has been referred to above.

The present invention constitutes a machine in which a plurality of eggs are disinfected and then simultaneously punctured and inoculated with a fine needle syringe, the operation being conducted under sterile conditions, and contamination by possible fragmentation of the eggshell is eliminated. At the same time, while there is no way theoretically of avoiding all incidences of traumatic injury to the embryo, the machine of the present invention permits reducing such mortality to half or less as compared with hand operation and the speed is greatly increased, for example from five to six times as great speed. An additional saving is represented by the fact that labor is reduced to a very small minimum with outputs an order of magnitude greater than could be done with the same amount of labor when all manual operation is carried out as has been done in the past.

Essentially the present invention utilizes a fine gauge hypodermic needle, or rather a battery of them; however, the needle moves in a bore through a much stiffer member and is supported by it except the minute length represented by the thickness of the eggshell. A further advantage of the present invention is that there can be an automatic adjustment for eggs of varying sizes so that the inoculating needle, after puncturing the eggshell, always enters the embryonated egg to a predetermined depth regardless of egg size. Even a skilled operator can occasionally make an incorrect angle of entry into the egg proper, and this is one of the principal reasons for the higher mortality through traumatic injury in manual operation over the machine operation of the present invention.

In general the needle passes through a passageway supporting it in a larger member which is provided with a spring and can move through predetermined distances which can be accurately determined and locked by suitable set screw. Both syringe and member can move upwardly through a limited distance under a relatively weak spring, so that different sizes of eggs can be accommodated. The needle protecting sleeve is capable of moving in a bore in the member which permits variation for egg size against a much stronger spring so that when the needle protector is moved up, the needle is forced through the eggshell and in to a predetermined distance determined by setting the needle hub in the moving member.

The introduction of predetermined amounts of inoculum is effected by any suitable design of measuring pump, and in the more detailed description will follow, a preferred form is shown in which the pumping is effected by the motion between egg holding member and the needle so that the same moving elements are capable of performing two functions. The invention, of course, is not limited to such a pump, and any suitable measuring pump may be used. However, in a more specific aspect the preferred form, referred to above, is included.

The invention will be described in greater detail in conjunction with the drawings, in which:

FIG. 3 is a section through a needle and egg at the completion of inoculation;

FIG. 4 is a similar section before inoculation has started;

FIG. 7 is a diagrammatic illustration of a sterile room or booth, and FIG. 8 is a detail section of the flame sterilization elements for sterilizing needles.

Figure 1:
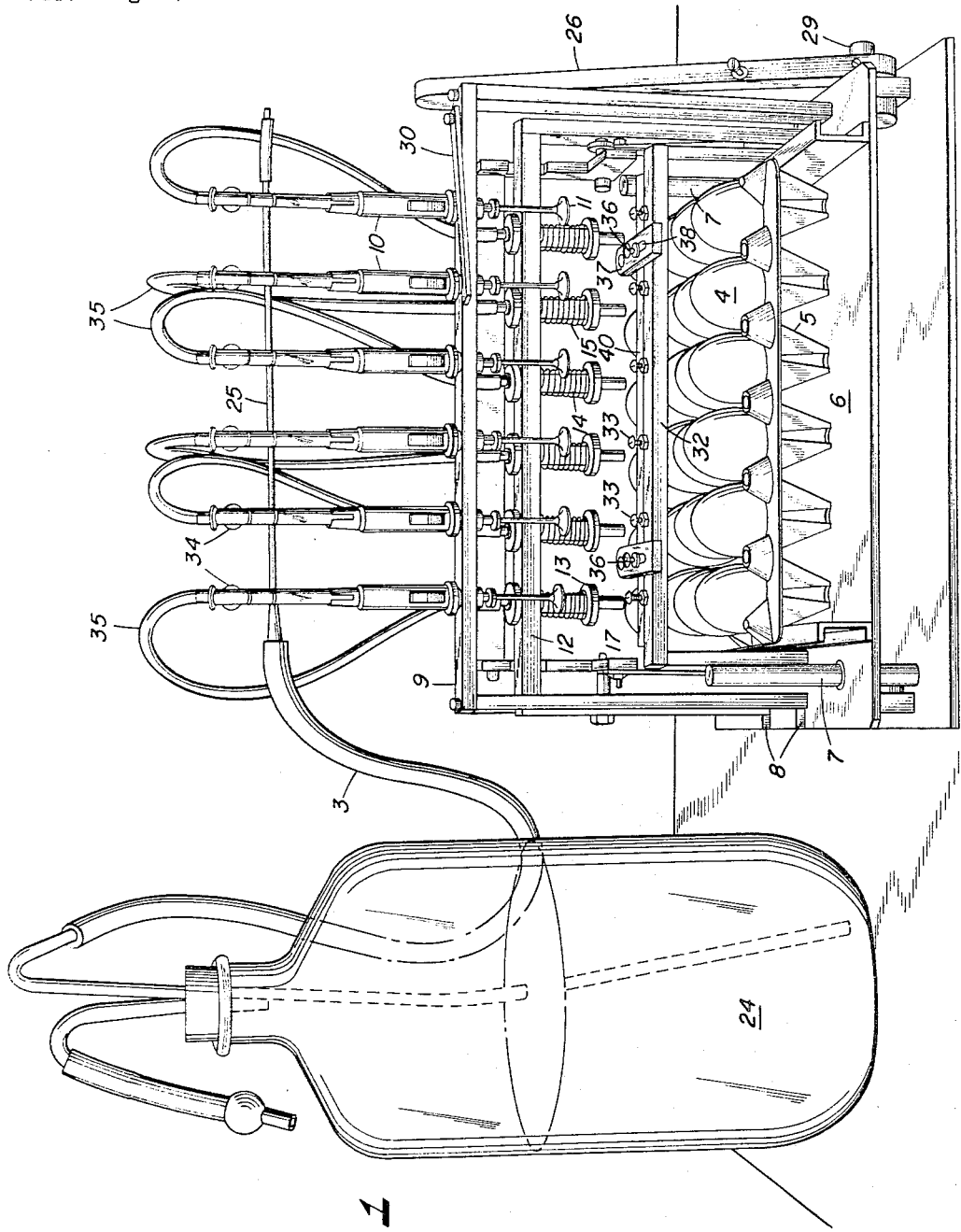
FIG. 1 is an elevation of a machine before inoculation.
Figure 2:
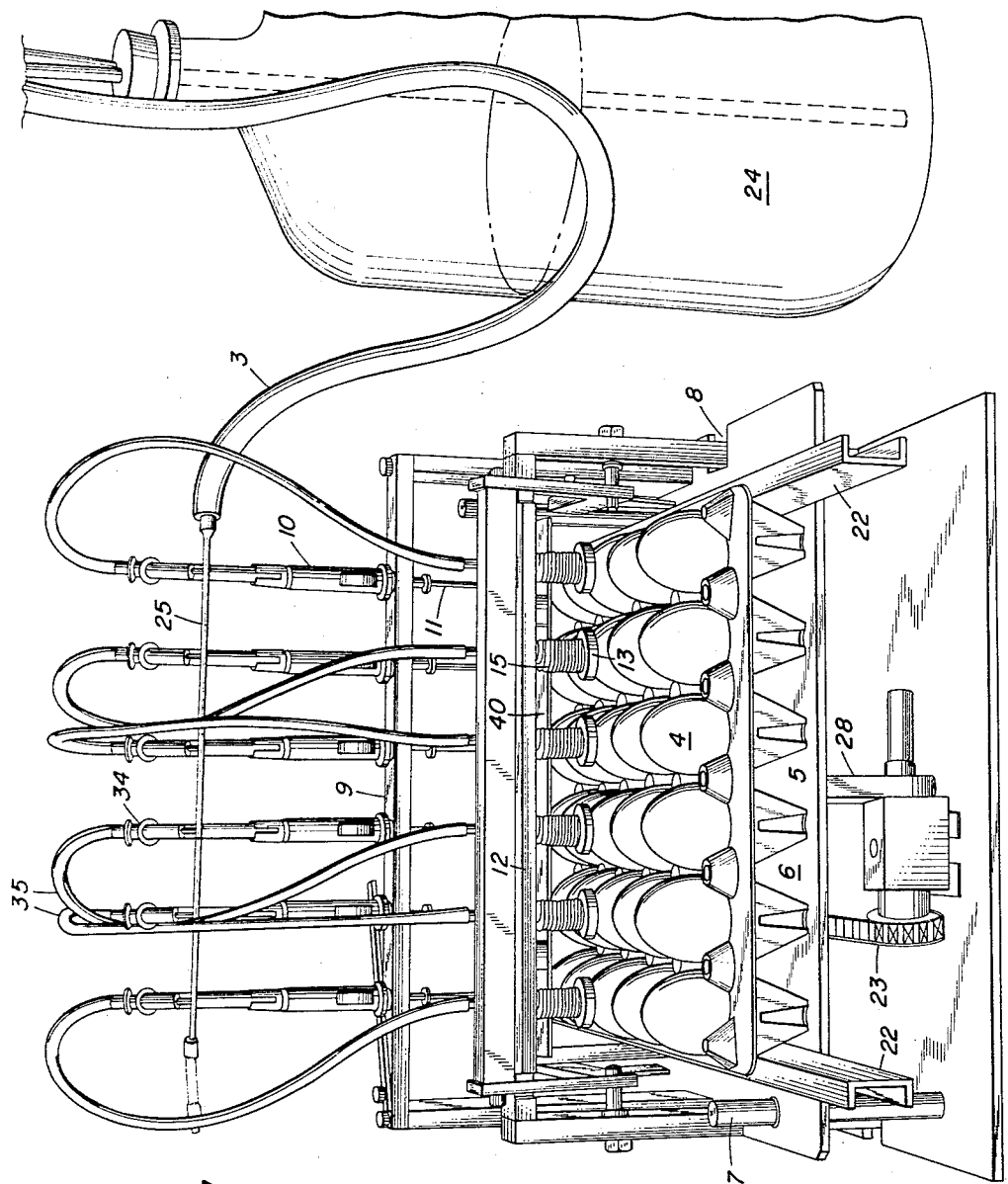
FIG. 2 is a similar elevation while inoculation is taking place.

In FIGS. 1 and 2 the machine is shown as is so that the operation of the machine may be more clearly shown. However, in FIG. 7 a sterile room or booth is shown at 1 without an ultraviolet sterilizing lamp at 2. This maintains a sterile atmosphere in the operation of the machine. The machine itself is not shown but only the supply 24 and tube for biological filling 3 appear.

Turning to FIG. 1, the eggs 4 are supported in an egg crate 5, which holds 30 eggs in five rows of six. This egg crate rests on a plate 6, which is capable of sliding up and down on the rods 7. The plate is provided with slots 8 through which supporting members extend up to a cross bar 9 carrying six pumps or syringes 10 actuated by the plungers 11 and a second cross bar 12 carrying six needles 20 with egg-engaging flanges 13 on egg size variation members 14, the flanges 13 being provided with springs 15 bearing against cross bar 12. Within each member 14 (FIGS. 3 and 4), there is a bore 16 in which a flanged syringe needle protector 17 is free to move against the spring 18, which bears on the needle hub 19, the position of which can be adjusted and held by the set screw 21. The hubs are provided with needles 20, the construction being best seen in FIGS. 3 and 4, and for the modified machine in FIGS. 5 and 6, which will be described below.

When a row of eggs is underneath the six needles and needle protectors, as shown in FIGS. 1 and 4, a lever 26 is moved by hand. This turns three cams 28 which are connected together by the chain 23. One cam and the chain appear in FIG. 2 and the others cannot be seen either in this figure or in FIG. 1 as they are hidden by the plate, but they are turned by the shaft 29 to which the handle 26 is connected. The movement of the lever 26 in FIG. 1 is out of the paper, and when in its extreme position, it is possible to lock it by a pivoted locking plate 30, which is shown in FIG. 1. The purpose for this locking at intervals will be described below.

Rotation of the cams by the lever 26 causes the plate 6 to move up to the position shown in FIG. 2. The needle protector 17 move up until the needles are forced through the eggshells as is shown, for one needle, in FIG. 3. This drives the needle into the allantoic sac of the embryonated egg and at the same time the cross bar 32 moves up and the adjustable threaded projections 33 strike the plungers 11 causing them to rise in the pumps and to discharge into the eggs through the needles a predetermined amount of inoculum. The mechanism is shown in FIG. 1, and backflow of inoculum is prevented by the check valves 34. Previously the plungers were moved to the position shown in FIG. 1 by springs (not shown), and filled the syringe barrels of the pumps with inoculum from a reservoir 24 through the tube 3 and manifold 25. The connections from the pumps or syringes to their needles is by flexible tubes 35. As the pumps are in the form of syringes and are of more or less standard design, they are only shown in elevation in FIGS. 1 and 2 since the internal construction thereof, as such, forms no part of the present invention. Adjustment of the threaded members 33 determine the amount of inoculum pumped, which for example, may be 0.1 or 0.2 ml. for each egg.

The cams 28 are then moved back by the lever 26, dropping the plate 6 to the position shown in FIG. 1. The egg crate 5 is then moved forward by hand one row of eggs, the crate riding on two channels 22 which are rigidly attached to the plate 6. The lever 26 is then moved forward again and the inoculating procedure described above is repeated.

It will be seen that the needle protectors 17 are moved up by the eggs until the egg strikes the flanges 13 which then can move up slightly in the case of larger eggs. This take-up for different egg size is clearly shown in FIG. 3. It will be apparent from a consideration of FIGS. 3 and 4 that the small upward movement of the member 14 permits a constant penetration of the needle 20 into the egg regardless of variations in size. The depth to which the needle penetrates is determined solely by the fine adjustment of the needle hub 19 locked by the set screw 21. There is thus no danger of a large egg resulting in too great a syringe needle penetration, which could lead to traumatic injury of the embryo.

The plate 6 is sufficiently long so that more than one tray can be accommodated. Thus when the first crate is inoculated in all six rows, a second crate is pushed by the operator into position and the inoculated tray removed. After a predetermined number of egg crates have been inoculated, for example, three, the operation is temporarily interrupted after the last crate is removed and the needles are flame sterilized. This is effected by loosening two thumb screws 36 which are shown on FIG. 1 and FIG. 8, and the brackets 37 are moved the full length of the slots 38. These brackets carry a depressed plate 40 with slots 39 aligned with each of the needles 20. The slots are large enough so that they accommodate the needles but are small enough so that the needle protectors 17 cannot slide therethrough.

The lever 26 is now pulled forward, raising the cross bar 32 and with it the plate 40, and this pushes up the needle protectors as is shown in FIG. 8. The latching member 30 is now swung out so that it engages the lever 26 and prevents it from being moved back into the position corresponding to FIG. 1. A flame is then passed along the needles, sterilizing them. After sterilization the locking member 30 is swung back to its normal position, as shown in FIG. 1, and the lever 26 returned to the position shown in that figure. The thumb screws 36 are then loosened and the brackets 37 moved back to the position shown in FIG. 1, the thumb screws then being tightened, and the machine is ready for another sequence of inoculations. A new crate with eggs is slid under, as has been described, and the inoculating procedures are repeated.

The machine depends for the force opposing rising of the needle protectors being supplied by the springs 18. This is quite satisfactory but requires a rather careful adjustment of spring tension. This must be sufficient so that the needle protectors 17 are reliably moved down to cover the ends of the needles, as shown in FIG. 4, so that no unprotected length of needle is encountered by a rising egg. However, if the spring is too strong, the pressure on the end of the needle protector 17 may be sufficient to crack an eggshell, and therefore, as has been stated above, the spring tension must be adjusted with considerable care.

Figures 5, 6:
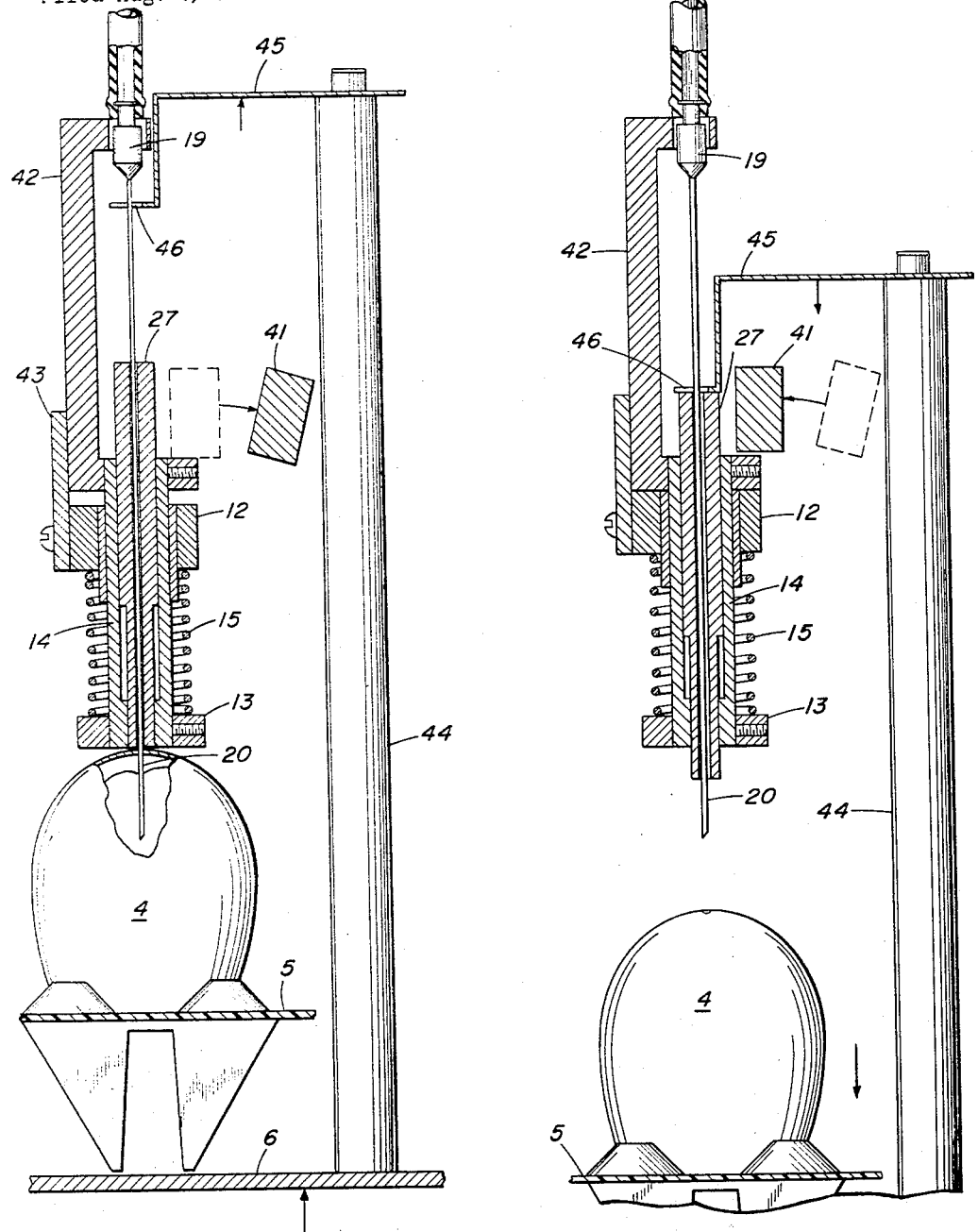
FIG. 5 is an elevation, partly in section, of a modified form of machine.
FIG. 6 is a corresponding figure to FIG. 5 showing the machine at a different position in its cycle.

A modification of the machine which eliminates the springs 18 will be described in connection with FIGS. 5 and 6, in which the elements which are the same as in FIGURES 1 to 4 are given the same reference numerals. The lever operation, which raises and lowers the plate 6 is unchanged and therefore this is not repeated in FIGS. 5 and 6, which show only in section the portion of the machine which differs. In FIGS. 5 and 6, a sleeve 43 is shown attached to the stationary cross bar 12 and a channel shaped member 42 is free to slide therein for short distances. This channel shaped member is fastened by set screws to the member 14 which, as described in connection with FIGS. 1 to 4, permits limited movement for compensating for different size eggs. It carries the needle hubs 19, requiring of course somewhat longer needles, and when an egg is to be punctured it is held against movement by a bar 41 which swings into contact with the flange of the member 42. This position is shown in FIG. 5 in dashed lines. Now when the plate 6 and with it the eggs rise, the needle protectors 27 are moved up, but the member 14 can move no further than the point at which the bar 41 holds down the member 42. Thereupon the needle protector rises and the eggshell is punctured and inoculation takes place as described in conjunction with FIGS. 1 to 4. FIG. 5 shows the position after an egg has been inoculated, the bar 41 having been swung out of contact as soon as the eggshell is penetrated.

The plate 6 is provided with pillars 44 which carry at their tops plates 45 with slots 46 permitting the plate to move up and down along the needles 20, but the slots being smaller than the needle protectors 27. Now when the plate 6 moves down, the columns 44 move with it, and the plate 45 moves down, positively pushing the needle protectors into their lowest position so that on the next inoculation the eggs strike the needle protectors at the same time that they encounter the ends of the needles. FIG. 6 shows the operation just before plate 6 has reached its lowest point, at which point both the needle protectors 27 and the members 42 are moved down to the lowest position, the bar 41 having been swung into locking position. Accommodation for different size eggs can be seen by comparing the position of the member 42 in FIG. 5 with its position flush against the cross bar 12 in FIG. 6.

The return of the needle protectors to their position before puncturing an egg is positively effected and requires no adjustment of spring tension. The modification shown in FIGS. 5 and 6 therefore presents this advantage, that there can be no malfunctioning due to improper spring tension. This rarely occurs in the modification shown in FIGS. 1 to 4, but is not theoretically impossible and so from this standpoint the modification of FIGS. 5 and 6 may be considered as somewhat preferred. Theoretically the spring 15 could be dispensed within the modification of FIGS. 5 and 6, but in a practical machine a light spring is sometimes desirable as it exerts a certain pressure of the flanges 13 against the eggs, which helps to hold them firmly in the egg crates. As the function of the spring is only to keep eggs upright, its tension may be much lighter than in the modification shown in FIGS. 1 to 4.

The operation of the apparatus of the present invention has been described in connection with a mechanism in which the egg containers are raised, while the needle cross bar 12 or members 42 remain stationary. This is the preferred mechanism, as it provides for a maximum of rigidity and alignment of the syringes with their needles and is therefore a preferred modification. Since the invention proceeds by reason of a relative movement between the needles and their protecting members and the eggs, the same result is obtained if the eggs are maintained at a stationary elevation and the cross bar moves down. This requires a somewhat more complicated mechanism with more moving parts, but operates in the same way and maintains the basic advantage of the present invention, which permits a small gauge needle to puncture with eggs without fragmentation and without bending. In its broader aspects, therefore, the present invention contemplates any means which will produce the necessary relative movement between the eggs and the syringe needles and their protectors.

The apparatus of the present invention is useful with a large number of biologicals, typical examples of which are—

*Viruses.*—Influenza, mumps, Newcastle, fowl pox, infectious bronchitis, rabies, laryngotracheitis.

*Rickettsia.*—Epidemic typhus, Rocky Mountain Spotted Fever, psittacosis, Q fever.

*Bacterial organisms.*—Streptococci, staphylococci, corynebacteria, brucella, hemophilus, mycoplasma.

*Mycotic agents.*—Actinomyces, nocardia, blastomyces, coccidioides, histoplasma.

When tested with various strains of influenza virus, Ann Arbor No. 417 and Ann Arbor No. 423, the machine gave as satisfactory virus activity in harvested fluids as was previously effected by hand operation, and of course, as pointed out above, at the greatly increased speed and hence productivity. With 0.2 ml. inoculum the machine exhibited mortality of the embryonated eggs of about 2%, whereas by hand the mortality ran from about 4% to as high as 7% in the case of the Ann Arbor strain No. 423. It will be seen, therefore, that the apparatus of the present invention effects marked increase in productivity, maintenance of sterile environment, and at the same time does not have any disadvantages, actually reducing the mortality rate. The apparatus of the present invention is useful with any embryonated egg, the tests referred to above being with fertile chicken eggs, which is the most common form of fertile eggs used. The apparatus, however, is equally effective with other eggs, such as for example fertile duck eggs, which are preferred for certain vaccines.

The invention has been described in connection with the inoculation of fertile eggs with microorganisms such as viruses, bacteria and the like. This is the most important single field of use for the machine of the present invention, but the machine is not limited thereto and can be used for inoculating eggs, either fertile or unfertilized, with other materials, for example inoculation with antibiotics, which may improve the growth of an embryo in case of fertile eggs or provide better keeping or other qualities for unfertilized eggs. For certain of these other uses, the provision of a substantially sterile environment may not always be necessary, and so the present machine is covered broadly whether or not means are provided for maintaining a substantially sterile environment. Another use is the injection of hormones into fertile eggs in order to influence the sex of the chicks which hatch. Thus, for example, for many purposes it is desirable to increase the percentage of females over that which would normally occur at random.

We claim:

1. An apparatus for inoculation of embryonated eggs, comprising in combination,
   (a) egg holding means capable of holding eggs in aligned rows,
   (b) a row of hypodermic needles aligned with the row of eggs,
   (c) each hypodermic needle being surrounded by a needle protecting member having a channel through which the needle passes of sufficiently close cross sectional match to the cross section of the needle so that the latter can move freely but cannot bend,
   (d) means for producing relative movement between the eggs and the needles whereby when the needles and eggs are brought together the needle protecting members slide up the needles, permitting them to puncture the shells of the eggs,
   (e) means adjacent the needle protecting member for maintaining constant travel length of the needles into the eggs whereby injury to egg embryos is reduced,
   (f) means connected to the needle for pumping a predetermined volume of inoculum through each needle when it has punctured the eggshell and penetrated to a fixed depth, and
   (g) means for returning the needle protecting members to their original position.

2. An apparatus according to claim 1 in which means are provided for maintaining a substantially sterile environment within the machine.

3. An apparatus according to claim 2 in which the means for producing relative movement between eggs and needles comprises means for raising and lowering the eggs and maintaining the needles stationary.

4. An apparatus according to claim 1 in which the means for producing relative movement between eggs and needles comprises means for raising and lowering the eggs and maintaining the needles stationary.

5. An apparatus according to claim 4 in which the means for returning the needle protecting members to their original position comprises resilient means connecting the needle protecting members and the stationary needle holding means whereby when the eggs are raised the needle protecting members move up against the resilient means and are returned to original position after the eggs are lowered.

6. An apparatus according to claim 5 in which the means for maintaining the needles stationary comprise members capable of limited movement against resilient means to accommodate for eggs of different size.

7. An apparatus according to claim 4 in which the needle protecting members are free to move under gravity along the needles and means are provided rigidly connected with the means for raising and lowering the eggs, said means contacting the upper ends of the needle protectors and moving them down positively to original position when the eggs are lowered.

8. An apparatus according to claim 7 in which locking means are actuated on raising the eggs to prevent upward movement of the needles.

9. An apparatus according to claim 4 in which the means for pumping predetermined volumes of inoculum through the hypodermic needles are maintained stationary and are provided with movable plungers, and a contacting member rigidly connected to the egg holding means strikes the plungers whereby when the egg holding means are raised the plungers are actuated at a predetermined moment in the cycle.

10. An apparatus according to claim 7 in which the means for pumping predetermined volumes of inoculum through the hypodermic needles are maintained stationary and are provided with movable plungers, and a contacting member rigidly connected to the egg holding means strikes the plungers whereby when the egg holding means are raised the plungers are actuated at a predetermined moment in the cycle.

References Cited
UNITED STATES PATENTS

| | | | |
|---|---|---|---|
| 2,005,395 | 6/1935 | Rothfield | 99—355 |
| 2,445,490 | 7/1948 | Meade | 146—2 |
| 2,496,559 | 2/1950 | Piechczek | 128—214 |
| 2,520,719 | 8/1950 | Hanson | 99—256 X |
| 2,645,171 | 7/1953 | Moreland | 99—257 |
| 2,656,785 | 10/1953 | Gannon et al. | 99—257 |
| 2,786,468 | 3/1957 | Singer et al. | 128—218 |
| 2,862,528 | 12/1958 | Geisler | 99—256 X |
| 3,035,508 | 5/1962 | Nelson | 99—257 |
| 3,120,834 | 2/1964 | Goldhaft et al. | 119—1 |
| 3,296,953 | 1/1967 | Bjor-Henriksen et al. | 99—256 |

FOREIGN PATENTS

| | | |
|---|---|---|
| 28,796 | 12/1913 | Great Britain. |

ALDRICH F. MEDBERY, *Primary Examiner.*